United States Patent [19]

Gai et al.

[11] Patent Number: 6,061,706

[45] Date of Patent: May 9, 2000

[54] SYSTOLIC LINEAR-ARRAY MODULAR MULTIPLIER WITH PIPELINE PROCESSING ELEMENTS

[75] Inventors: Weixin Gai; Hongyi Chen, both of Beijing, China

[73] Assignee: United Microelectronics Corp., Hsin-Chu, Taiwan

[21] Appl. No.: 08/949,036

[22] Filed: Oct. 10, 1997

[51] Int. Cl.[7] ............................................. G06F 7/38
[52] U.S. Cl. ................................................. 708/491
[58] Field of Search ................................. 708/491, 620

[56] References Cited

U.S. PATENT DOCUMENTS

| | | | |
|---|---|---|---|
| 4,797,848 | 1/1989 | Walby | 708/491 |
| 5,101,431 | 3/1992 | Even | 708/491 |
| 5,313,530 | 5/1994 | Iwamura | 708/491 |
| 5,414,651 | 5/1995 | Kessels | 708/491 |

*Primary Examiner*—Tan V. Mai
*Attorney, Agent, or Firm*—Finnegan, Henderson, Farabow, Garrett & Dunner, L.L.P.

[57] ABSTRACT

A systolic linear-array modular multiplier is provided, which can perform the modular multiplication algorithm of P. L. Montgomery more efficiently. The total execution time for n-bit modular multiplication is 2n+11 cycles. The modular multiplier includes a linear array of processing elements which is constructed based on a pipeline architecture that can reduce the computation procedure by one clock period. Each of the processing elements is simple in structure, which is composed of four full adders and fourteen flip-flops. For n-bit modular multiplication, a total number of 46n+184 gates is required, which is substantially less as compared to the prior art, so that manufacturing cost of the modular multiplier can be significantly reduced. These features make the modular multiplier suitable for use in VLSI implementation of modular exponentiation which is the kernel computation in many public-key cryptosystems, such as the RSA (Rivest-Shamir-Adleman) system. With the 0.8 $\mu$m CMOS technology, a clock signal up to 180 MHz can be used. In average, for n-bit modular multiplication, the encryption speed can reach 116 Kbit/s (kilobits per second), which is substantially twice that achieved by the prior art.

4 Claims, 4 Drawing Sheets

| CLOCK PULSE | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| $q_{out}$ | 1 | 1 | 1 | 1 | 1 | 1 | 1 | 1 | 1 | 1 | 1 | 1 | 1 | 0 | 0 | 0 | 0 | 0 | 0 | 0 |
| $b_{in}$ | $b_0$ | $b_1$ | $b_2$ | $b_3$ | $b_4$ | $b_5$ | $b_6$ | 0 | 0 | 0 | 0 | 0 | 0 | 0 | 0 | 0 | 0 | 0 | 0 | 0 |
| $q_{in}$ | 0 | 0 | 0 | $q_1$ | $q_2$ | $q_3$ | $q_4$ | $q_5$ | $q_6$ | $q_7$ | $q_8$ | $q_9$ | $q_{10}$ | 0 | 0 | 0 | 0 | 0 | 0 | 0 |
| $S_{out}$ | 0 | 0 | 0 | $q_1$ | $q_2$ | $q_3$ | $q_4$ | $q_5$ | $q_6$ | $q_7$ | $q_8$ | $q_9$ | $q_{10}$ | $S_0$ | $S_1$ | $S_2$ | $S_2$ | $S_4$ | $S_5$ | $S_6$ |

FIG. 5

SYSTOLIC LINEAR-ARRAY MODULAR MULTIPLIER WITH PIPELINE PROCESSING ELEMENTS

BACKGROUND OF THE INVENTION

1. Field of the Invention

This invention relates to modular multipliers, and more particularly, to a systolic linear-array modular multiplier with pipeline processing elements (PE) which can effectively perform a modular multiplier algorithm which is a modified version of the algorithm of P. L. Montgomery.

2. Description of Related Art

In this information age, the advent of high-speed computers and global communication networks allow people anywhere around the world to process and exchange information conveniently. Various network systems, such as the INTERNET system, allow the people to gain access to information bases that are located at remote places all around the world. In the use of these network system, it is important to keep data from illegal access. The public-key cryptosystem, for example, is a widely used scheme to protect network systems from being accessed by unauthorized users.

Large-operand modular multiplication is the core computation of many public-key cryptosystems, such as the RSA (Rivest-Shamir-Adleman) system which is a public-key cryptosystem proposed by R. L. Riverst, A. Shamir, and L. Adleman. It includes a series of modular multiplication steps, which involve large operands as large as 512 bits in length. The modular multiplication is thus quite complex and time-consuming to perform by conventional computers. To solve the speed problem, a widely used scheme is to arrange a number of processing elements (PE) in a so-called systolic array that allows the modular multiplication steps to be carried out in parallel, thereby significantly increasing the encryption/decryption speed of public keys. This scheme is also suitable for VLSI (very large-scale integration) implementation. Many research papers have proposed various kinds of architectures for implementing a modular multiplier in systolic array. To name a few, C. K. Koc et al. have published a paper entitled "Bit-level Systolic Arrays for Modular Multiplication" in J. VLSI Signal Processing, Vol. 3, pp. 215–223, 1991; C. D. Walter has published a paper entitled "Systolic Modular Multiplication" in IEEE Trans. Comput., Vol. 42, No. 3, pp.376–8; P. Kornerup has published a paper entitled "A Systolic Linear-array Multiplier For A Class Of Right-Shift Algorithms" in IEEE Trans. Comput., Vol. 43, No. 8, pp. 892–898, August 1994; and Weixin Gai et al (who are also the inventors of this application) have published a paper entitled "A Systolic Linear Array For Modular Multiplication" in the 2nd International Conference on ASIC Proceedings (ASICON'96), Shanghai, pp. 171–174, October 1996.

The modular multipliers suggested by these papers, however, are still unsatisfactory in performance, in that the modular multiplier proposed by C. K. Koc et al. uses a clock signal of a very low rate that causes the processing time required to produce the output to be in the order of 13n/2, where n is the number of bits of the operands involved in the modular multiplication; the modular multiplier proposed by C. D. Walter requires a total of about four trillion ($4 \times 10^{12}$) gates to implement, which makes the manufacturing cost very high; the modular multiplier proposed by P. Kornerup uses a clock signal of about 100 THz (tera-hertz) that allows for an encryption speed in the order of $10^5$ bits per second, which is still considered unsatisfactory; and the modular multiplier proposed by Weixin Gai et al uses a clock signal of about 200 THz, but the encryption thereof is similar in performance to that of the modular multiplier proposed by P. Komerup, which is still considered unsatisfactory.

There exists, therefore, a need for a new modular multiplier which can provide an increased performance for the modular multiplication required in public-key cryptosystems, and also a reduced degree of complexity in architecture so as to reduce the manufacturing cost thereof.

SUMMARY OF THE INVENTION

It is therefore an objective of the present invention to provide a modular multiplier which can provide an increased computation speed for the modular multiplication required in public-key cryptosystem as compared to the prior art.

It is another objective of the present invention to provide a modular multiplier which can be constructed with a reduced degree of complexity in architecture so that the manufacturing cost thereof can be reduced.

In accordance with the foregoing and other objectives of the present invention, a systolic linear-array modular multiplier with pipeline processing elements (PE) is provided. The systolic linear-array modular multiplier of the invention is designed in particular to implement the modular multiplication $S = AB2^{-(n+6)} \mod M$, where n is an integer;

A is an (n+3)-bit binary number $a_{n+2} \, a_{n+1} \, \ldots \, a_1 \, a_0$;

B is an (n+3)-bit binary number $b_{n+2} \, b_{n+1} \, \ldots \, b_1 \, b_0$; and mod M is an n-bit binary odd number $m_{n-1} \, m_{n-2} \, \ldots \, m_1 \, m_0$, where $m_0 = 1$, in accordance with an algorithm including the steps of:

(1) performing the following pre-computation steps:

$$\overline{M} = ((8 - m_2 m_1 m_0)^{-1} \mod 8)M$$

$$T = (\overline{M} + 1) \text{div} 8$$

(2) defining $$S_0 = 0;$$

$$q_{-2} = q_{-1} = 0$$

(3) performing the following iteration loop:
for i=0 to n+6 do $$q_i = S_i \mod 2$$

$$S_{i+1} = S_i \text{div} 2 + q_{i-2} T + b_i A$$

end (4) performing the following computation:

$$S_{n+8} = S_{n+7} + 2q_{n+5} T$$

$$S = S_{n+8} + 4q_{n+6} T$$

Each of the processing elements is structured with an identical architecture, including four full adders, four AND gates, and ten D-type flip-flops. For n-bit modular multiplication, a total number of 46n+184 gates is required, which is substantially less as compared to the prior art, so that manufacturing cost of the modular multiplier can be significantly reduced. These features make the modular multiplier suitable for use in VLSI implementation of modular exponentiation which is the kernel computation in many public-key cryptosystems, such as the RSA (Rivest-Shamir- Adleman) system. With a clock signal of 200 MHz in frequency, the throughput of one single modular multiplier can reach up to 129 kb/s (kilobits per second).

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The Montgomery Modular Multiplication Algorithm

The Montgomery algorithm is based on a right-shift method. In this section, the basic principle of the Montgomery algorithm (the Algorithm I hereinunder) will be introduced first, and then a modified version of the Montgomery algorithm (the Algorithm II hereinunder) in accordance with the invention will be introduced. The modified version of the Montgomery algorithm is suitable for implementation with systolic array architecture that allows the modular multiplication steps to be carried out in parallel.

The following Algorithm I is a base-r Montgomery algorithm, where r and the module M are prime to each other, and M is an n-digit base-r number (which can be represented by $m_{n-1} m_{n-2} \ldots m_1 m_0$. In addition, the notation $(r-m_0)^{-1}$ mod r represents a reverse modular multiplication of $(r-m_0)$ mod r, i.e., $(r-m_0)^{-1} (r-m_0)$ mod r+1. The fact that r and M are prime to each other guarantees the existence of this reverse modular multiplication. Further, the notation $f$ mod g represents the remainder of $f$ being divided by g, while the notation $f$ div g represents the quotient of $f$ being divided by g. To facilitate VLSI implementation, the base is usually selected to be r=2. Hereinafter in the specification and claims, "mod" is defined as an integer operation to take the residue. Furthermore, "div" is defined as an integer operation of dividing.

Algorithm I:

Input:

A, n-bit binary number $a_{n-1} a_{n-2} \ldots a_1 a_0$

B, n-bit binary number $b_{n-1} b_{n-2} \ldots b_1 b_0$ mod M n-bit binary odd number $m_{n-1} m_{n-2} \ldots m_1 m_0$ where $m_0=1$ Output:

$S = AB2^{-n}$ mod M

The Montgomery modular multiplication algorithm:

$S_0 = 0$;

for i=0 to n do $\quad q_i = S_i(2-m_0)^{-i}$ mod 2 \quad (1)

$\quad S_{i+1} = (S_i + q_i M) \text{div} 2 + b_i A$ \quad (2)

end

Proof:

Since $q_1 = S_i(2-m_0)^{-1}$ mod 2

$\therefore q_1 = S_i(-m_0)^{-1}$ mod 2

$m_0 q_1 = -S_i$ mod 2

$\therefore (S_i + q_i M)$ is divisible by 2 without remainder

From the iteration:

$S_{i+1} = (S_i + q_i M) \text{div} 2 + b_i A$ for i=0,1,2, ..., n $\therefore 2S_1 = q_0 M + 2b_0 A$ $2^2 S_2 = 2(S_i + q_1 M) + 2^2 b_1 A$ $2^3 S_3 = 2^2 (S_2 + q_2 M) + 2^3 b_2 A$

. . .

$2^n S_n = 2^{n-1}(S_{n-1} + q_{n-1} M) + 2^n b_{n-1} A$ $2^{n+1} S_{n+1} = 2^n (S_n + q_n M)$

Sum up both sides:

$2^{n+1} S_{n+1} = 2b_0 A + 2^2 b_1 A + \ldots + 2^n b_{n-1} A - q_0 M - 2q_1 M - \ldots - 2^n q_n M$ Since $q_0 = 0$ $\therefore 2^{n+1} S_{n+1} = 2BA + 2QM$ where $B = \sum_{i=0}^{i-1} b_i 2^i$ and $Q = \sum_{i=0}^{n} q_i 2^{i-1}$ $\therefore S_{n+1} = 2^{-n}(BA - QM)$ $S_{n+1}$ mod $M = 2^{-n}$ BA mod M $S = 2^{-n}$ BA mod M It is clear that Eq. (1) and Eq. (2) are interrelated in such a manner that the computation procedures thereof can be adapted to share the same steps to increase the computation speed. Therefore, Eq. (1) can be rewritten as follows:

$q_i = S_i(2-m_0)^{-1} \bmod 2$

Since $m_0=1$ $q_i = S_i \bmod 2$ (3)

Since $S_{i+1} = (S_i + q_i M) \text{ div } 2 + b_i A$ $\therefore S_{i+1-(S_i+q_iM+q_1-q_2)\text{div}2+b_iA}$ $S_{i+1} = (S_i + q_i M + q_i - q_{i)\text{div}}2 + b_i A$ $S_{i+1} = (S_i - q_i + q_i (M+1)) \text{div} 2 + b_i A$ $S_{i+1} = S_i \text{div} 2 - q_i (M+1) \text{div} 2 + b_i A$ $S_{i+1} = S_i \text{div} 2 + [4q_i(M+1)/4] \text{div} 2 + b_i A$ $S_{i+1} = S_i \text{div} 2 + (q_{i-2}(M+1)/4) \text{div} 2 + b_i A$ (4)

In Eq. (4), the computation for $S_{i+1}$ is related to $q_{i-2}$, but unrelated to the current value of $q_i$. This allows the iteration steps for $S_{i+1}$ to be carried out in parallel. The term (M+1) is absolutely divisible by 2, but the term (M+1) might not be divisible by 8. Therefore, a new variable $\overline{M}$, which is an integral multiple of M, is introduced to substitute for the variable M in Eq. (4), i.e., $\overline{M} = ((8-m_2m_1m_0)^{-1} \bmod 8)M$ Accordingly, Eq. (4) can be transformed into the following expression:

$S_{i+1} = S_i \text{div} 2 + (q_i - 2(\overline{M}+1)/4) \text{div} 2 + b_i A$

Since $\overline{M} = \overline{m_{n+2} m_{n-1} \ldots m_2 m_1 m_0}$ $\overline{m_2 m_1 m_0} = (8-m_2m_1m_0)^{-1} m_2 m_1 m_0 \bmod 8 = (111)_2$ $\therefore (\overline{M}+1)/8 = (\overline{M}+1) \text{ div } 8$ $\therefore S_{i+1} = S_i \text{ div } 2 + q_{i-2} (\overline{M}+1) \text{ div } 8 + b_i A$ Let $T = (\overline{M}+1) \text{ div } 8$ then $S_{i+1} = S_i \text{div} 2 + q_{i-2} T + b_i A$ (5)

From Eq. (3) and Eq. (5), the following Algorithm II can be deduced, which is suitable for the implementation with a systolic array architecture. Details of this will be described in the following.

Algorithm II: Modular Multiplication

Input:

A, an (n+3)-bit binary number $a_{n+2} a_{n+1} \ldots a_1 a_0$

B, an (n+3)-bit binary number $b_{n+2} b_{n+1} \ldots b_1 b_0$ mod M n-bit binary odd number $m_{n-1} m_{n-2} \ldots m_1 m_0$ where $m_0=1$ Output:

$S = AB2^{-(n+6)} \bmod M$

Pre-computation:

$\overline{M} = ((8-m_2m_1m_0)^{-1} \bmod 8)M$ $T = (\overline{M}+1) \text{ div } 8$ Modular Multiplication MM (A, B, T)

$S_0 = 0;$ $q_{-2} = q_{-1} = 0$ for i=0 to n+6 do $q_i = S_i \bmod 2$ (6)

$S_{i+1} = S_i \text{div} 2 + q_{i+2} T + b_i A$ (7)

end $S_{n+8} = S_{n+7} + 2q_{n+5}T$ (8)

$S = S_{n+8} + 4q_{n+6}T$ (9)

Since $\overline{M} = 7*2^n$, T is an n-bit binary number (assume $T = t_{n-1} \ldots t_1 t_0$). The purpose of the for-statement from 0 to n+6 is to assure that the resultant S be small than $2^{n+3}$, allowing S to serve as A or B for next cycle of the modular multiplication. When the for-loop is completed, the final two parameters $q_i T(q_{n+2} T)$ and $q_i T(q_{n+1} T)$ are still not added by weight to S. Therefore, the computation procedures for Eq. (8) and Eq. (9) are required. In the computation procedures for Eq. (6) and Eq. (7), the current value of S is dependent on the previous value of q. Accordingly, the computation procedures for S can be separated and carried out in parallel, and thus a systolic array modular multiplier can be implemented to perform these computation procedures for S. A preferred embodiment of the systolic linear-array modular multiplier in accordance with the invention to perform the foregoing modular multiplication algorithm will be disclosed in the following.

Exemplary Embodiment of the Invention

Figure 1A:
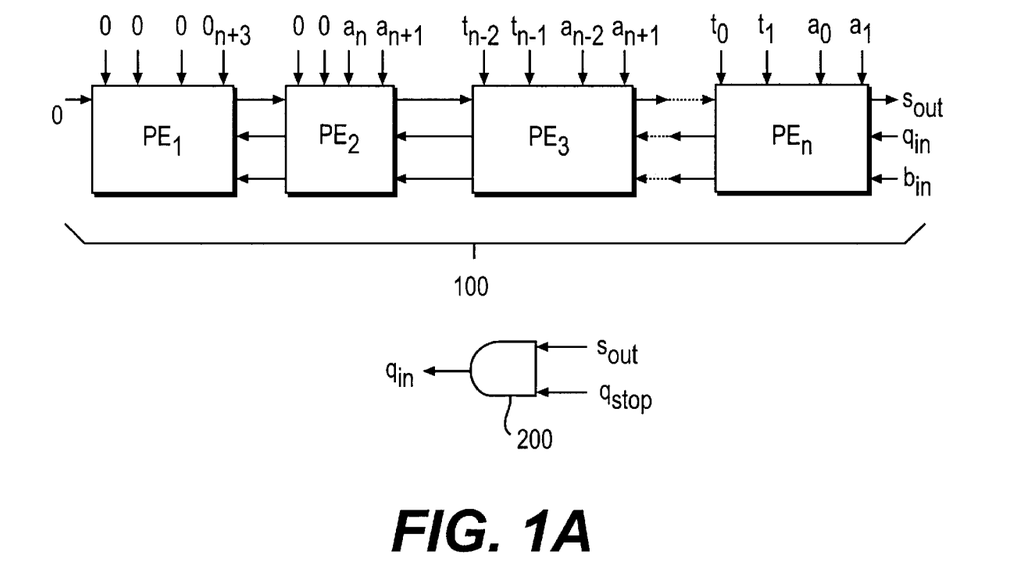
FIG. 1A is a schematic block diagram of an n-bit representation of the systolic linear-array modular multiplier in accordance with the invention.

A realization of an n-bit modular multiplier for implementing the foregoing Algorithm II in accordance with the invention is shown in FIG. 1A. For simplification of description, the following preferred embodiment will assume n=4, in which case the architecture of the modular multiplier is shown in FIG. 1B.

Figure 2:
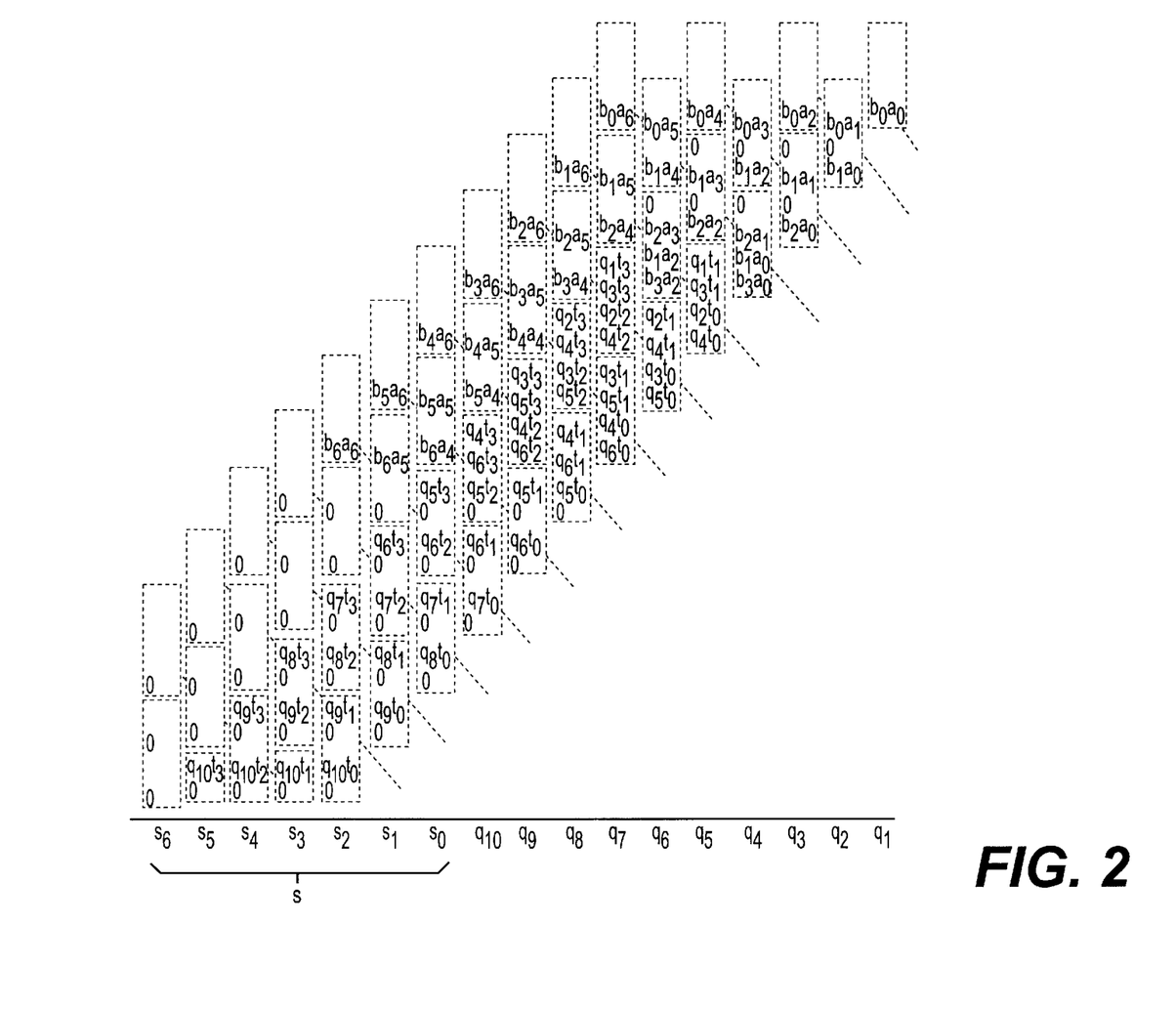
FIG. 2 is a schematic diagram used to depict the computation procedure in which the result of the modular multiplication carried out by the systolic linear-array modular multiplier of the invention is obtained.

In the case of n=4, the computation steps for the modular multiplication $S = AB2^{-(n+6)} \bmod M$ in accordance with Eqs. (6) through (9) is schematically illustrated in FIG. 2. During the modular multiplier steps, intermediate values $q_{10} q_9 q_8 q_7 q_6 q_5 q_4 q_3 q_2 q_1$ will be obtained after a total of 10-mod-2 multiplication steps have been performed. As shown, an intermediate result of the computation is $[s_6 s_5 s_4 s_3 s_2 s_1 s_0 q_{10} q_9 q_8 q_7 q_6 q_5 q_4 q_3 q_2 q_1]$. To obtain the value of S, the right most ten digits should be omitted, leaving the left most seven digits as the final result, i.e., $S = [s_6 s_5 s_4 s_3 s_2 s_1 s_0]$.

Figure 1B:
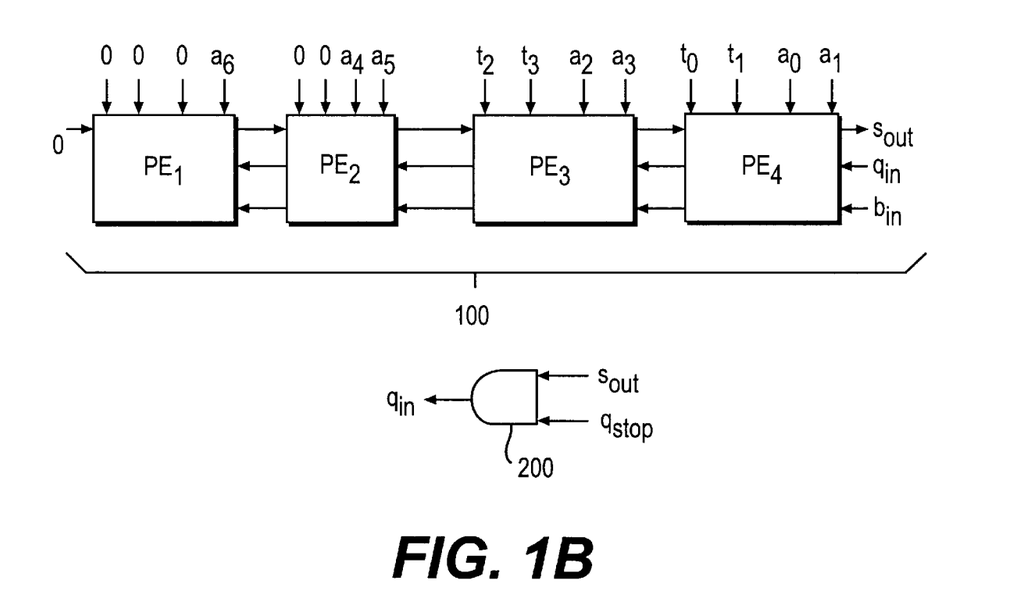
FIG. 1B is a schematic block diagram of the systolic linear-array modular multiplier of FIG. 1A in the case of n=4.
Figure 3:
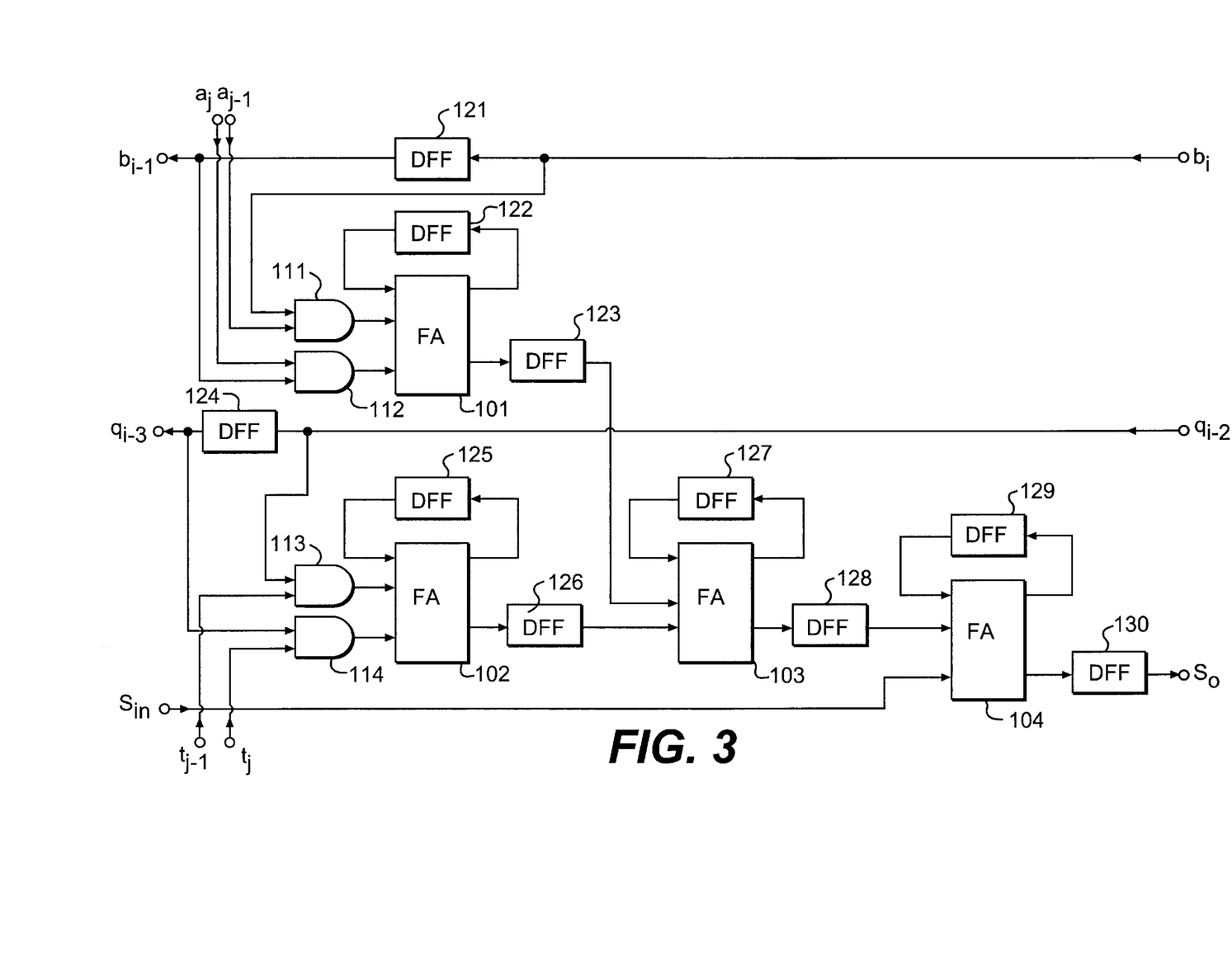
FIG. 3 is a schematic circuit diagram showing a detailed inside structure of each of the processing elements (PE) utilized in the systolic linear-array modular multiplier of the invention.

A realization of the 4-bit modular multiplier in accordance with the invention for implementing the foregoing modular multiplication algorithm is shown in FIG. 1B, which is composed of four processing elements $PE_{(i)}$ 100, i=1 to 4, of an identical structure as shown in FIG. 3, and a AND gate 200. The number of processing elements is, for example, equal to n/2+2 so that it is 4 for n=4.

As shown in FIG. 3, each of the processing elements $PE_{(i)}$ 100, i=1 to n, has seven input ends for receiving $[t_{j-1}, t_j, a_{j-1}, a_j]$, $[b_i, q_{i-2}]$, and $S_{in}$, and three output ends for outputting $b_{i-1}$, $q_{i-3}$, and $S_O$. The $t_{j-1}$, $t_j$, $a_{j-1}$, and $a_j$ respectively represent binary bits of the related numbers T and A in the S computation. Each of the processing elements is inputted with two consecutive binary bits.

Referring to FIG. 1B together with FIG. 3, for the first processing element $PE_1$, the input end $S_{in}$ is set to receive a value of 0, the output end $S_O$ is connected to the input end $S_{in}$ of the second processing element $PE_2$, and the input ends bi and $q_{i-2}$ are connected respectively to receive $b_{i-1}$ and $q_{i-3}$ from the second processing element $PE_2$. For the second and third processing elements $PE_2$ and $PE_3$ (those processing elements between the first and last processing elements), the input end $S_{in}$ is connected to receive the output $S_O$ from the preceding processing element, the output end $S_O$ is connected to the input end $S_{in}$ of the succeeding processing element, and the input ends $b_i$ and $q_{i-2}$ are connected respectively to receive $b_{i-1}$ and $q_{i-3}$ from the succeeding processing element, and the output ends $b_{i-1}$ and $q_{i-3}$ are connected respectively to the input ends $b_i$ and $q_{i-2}$ of the preceding processing element. For the fourth processing element $PE_4$ (i.e., the last processing element), the connections on the left side are similar to the second and third processing elements $PE_2$ and $PE_3$, but the output end $S_O$ (indicated by $S_{Out}$ in FIGS. 1A or 1B) is taken as the output of the systolic linear-array modular multiplier of the invention, and the two input ends are connected respectively to receive $q_{in}$ and $b_{in}$.

The AND gate 200 has two input ends connected respectively to receive $S_{Out}$ from the last processing element $PE_4$ in the array and a signal $q_{stop}$ from a control unit (not shown). The output of the AND gate 200, designated by $q_{in}$, is fed back to the processing element $PE_4$.

Referring to FIG. 3, each of the processing elements shown in FIGS. 1A or 1B is structured with an identical architecture which is composed of at least four fuller adders 101, 102, 103, 104; at least four AND gates 111, 112, 113, 114; and at least ten D-type flip-flops 121, 122, 123, 124, 125, 126, 127, 128, 129, 130. Each of the processing elements is designed to compute $a_j b_{i-1} + a_{j-1} b_i + t_j q_{i-3} + t_{j-1} q_{i-2} + S_{in}$ as described in the following.

The first AND gate 111 has two input ends connected respectively to receive $a_{j-1}$ and $b_i$, and one output end connected to one input end of the first full adder 101. The second AND gate 112 has two input ends connected respectively to receive $a_j$ and $b_{i-1}$, and one output end connected to another input end of the first full adder 101. The third AND gate 113 has two input ends connected respectively to receive $q_{i-2}$ and $t_{j-1}$, and one output end connected to one input end of the second full adder 102. The fourth AND gate 114 has two input ends respectively connected to receive $q_{i-3}$ and $t_j$, and one output end connected to another input end of the second full adder 102.

The first full adder 101 has three input ends respectively connected to receive the output of the second D-type flip-flop 122, the output of the first AND gate 111, and the output of the second AND gate 112; and a C (carry) output end connected to the input end of the second D-type flip-flop 122 and an S (sum) output end connected the input end of the third D-type flip-flop 123. The second full adder 102 has three input ends respectively connected to receive the output of the fifth D-type flip-flop 125, the output of the third AND gate 113, and the output of the fourth AND gate 114; and a C (carry) output end connected to the input end of the fifth D-type flip-flop 125 and an S (sum) output end connected the input end of the sixth D-type flip-flop 126. The third full adder 103 has three input ends respectively connected to receive the output of the seventh D-type flip-flop 127, the output of the third D-type flip-flop 123, and the output of the sixth D-type flip-flop 126; and a C (carry) output end connected to the input end of the seventh D-type flip-flop 127 and an S (sum) output end connected to the input end of the eighth D-type flip-flop 128. The fourth full adder 104 has three input ends respectively connected to receive the output of the ninth D-type flip-flop 129, the output of the eighth D-type flip-flop 128, and $S_{in}$, and a C (carry) output end connected to the input end of the ninth D-type flip-flop 129 and an S (sum) output end connected to the input end of the tenth D-type flip-flop 130. Since the relationship between the outputs and inputs of a full adder is well known in the art, it will not be detailed herein.

Further, the first D-type flip-flop 121 has an input end connected to receive $b_i$ and an output end for outputting $b_{i-1}$. The second D-type flip-flop 122 has an input end connected to receive the output from the C (carry) output end of the first full adder 101 and an output end connected to one input end of the first full adder 101. The third D-type flip-flop 123 has an input end connected to the S (sum) output end of the first full adder 101 and an output end connected to one input end of the third full adder 103. The fourth D-type flip-flop 124 has an input end connected to receive $q_{i-2}$ and an output end for outputting $q_{i-3}$. The fifth D-type flip-flop 125 has an input end connected to the C (carry) output end of the second full adder 102 and an output end connected to one input end of the second full adder 102. The sixth D-type flip-flop 126 has an input end connected to the S (sum) output end of the second full adder 102 and an output end connected to one input end of the third full adder 103. The seventh D-type flip-flop 127 has an input end connected to the C (carry) output end of the third full adder 103 and an output end connected to one input end of the third full adder 103. The eighth D-type flip-flop 128 has an input end connected to the S (sum) output end of the third full adder 103 and an output end connected to one input end of the fourth full adder 104. The ninth D-type flip-flop 129 has an input end connected to the C (carry) output end of the fourth full adder 104 and an output end connected to one input end of the fourth full adder 104. The tenth D-type flip-flop 130 has an input end connected to the S (sum) output end of the fourth full adder 104 and an output end for outputting $S_O$. Since the relationship between the output and input of a D-type flip-flop is well known in the art, it will not be detailed herein.

Figure 4A:
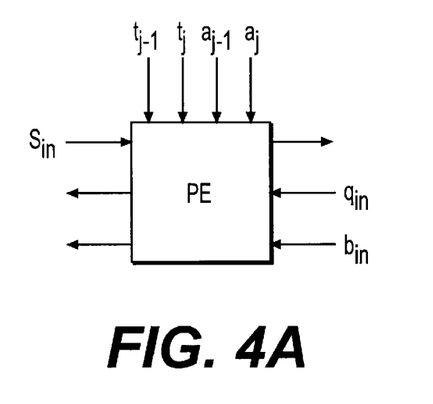
FIGS. 4A and 4B are schematic diagrams used to depict the inputs and outputs of a processing element before and after the appearance of a triggering pulse.
Figure 4B:
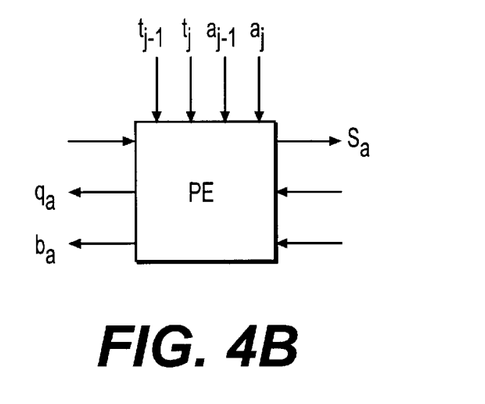

The inputs and outputs of the processing elements $PE_{(i)}$ 100, i=1 to n, are controlled by a clock signal. FIG. 4A and FIG. 4B show the inputs and outputs of each of the processing elements $PE_{(i)}$ 100, i=1 to n, in response to the clock signal, wherein FIG. 4A shows that, with the inputs $t_{j-1}$, $t_j$, $a_{j-1}$ and $a_j$, the processing element receives $S_{in}$, $q_{in}$, and $b_{in}$ that are input thereto prior to the appearance of a triggering pulse, and FIG. 4B shows the generation of the outputs $s_o$, $q_o$, and $b_o$ after the appearance of the triggering pulse.

Figure 5:
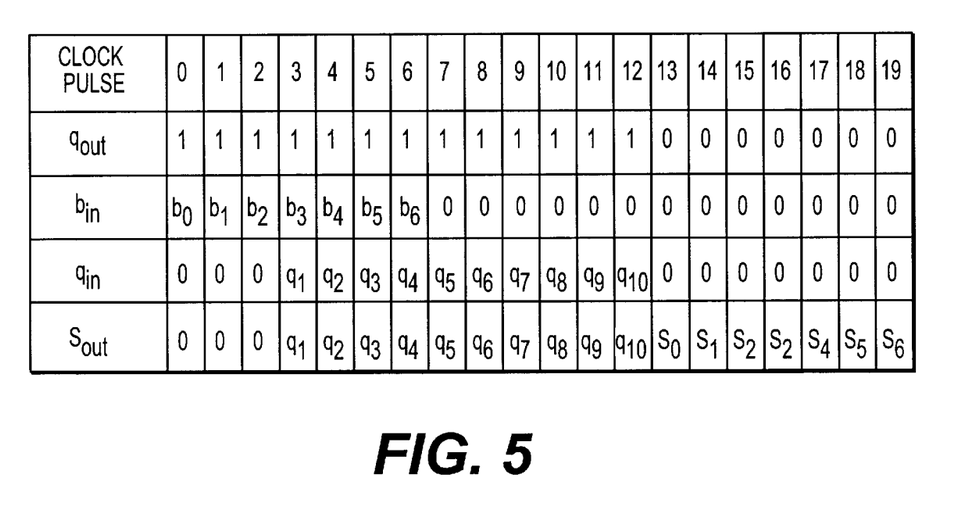
FIG. 5 is a truth table showing the values of four bits in response to a clock signal.

The states of $q_{stop}$, $b_{in}$, $q_{in}$, and $S_{Out}$ in response to the clock signal are shown in the truth table of FIG. 5. In accordance with the foregoing Algorithm II, the computation requires a total of 13 $q_{in}$ signals, namely from $q_{-2}$ to $q_{10}$, wherein $q_{-2}$ to $q_0$ are preset to a low-voltage state, while $q_1$ to $q_{10}$ are obtained through computation. Therefore, at the appearance of the 13th pulse in the clock signal, $q_{stop}$ is set to change from high-voltage state (logic-1) to low-voltage state (logic-0), thereby inhibiting the generation of $q_{in}$ (which is at the logic-0 state for all the time hereinafter). The overall computation requires a total of 19 clock pulses to complete. The resultant bits of S are serially obtained from the output port $S_{Out}$.

In the general case of an n-bit modular multiplier shown in FIG. 1A, a total of n-9 $q_{in}$ signals are required, and a total of 2n-11 clock pulses are required to complete the overall computation for the modular multiplication. For 0.8 $\mu$m CMOS technology, each full addition requires a duration of about 2 ns (nanosecond) to complete. In consideration of the setup time and hold time required by the flip-flops and the clock skew, a clock signal of 200 THz is absolutely feasible. In this case, it takes a computation period of 5(2n-11)=10n-55 ns to complete each n-bit modular multiplication. When n=512, the computation period is about 5.575 $\mu$s (microsecond).

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A systolic linear-array modular multiplier for implementing modular multiplication $S=AB2^{-(n+6)}$ mod M, where n is an integer, representing an ability to operate the n-bit multiplication in the modular multiplication;

A is an (n+3)-bit binary number $a_{n+2}\ a_{n+1}\ \ldots\ a_1\ a_0$;

B is an (n+3)-bit binary number $b_{n+2}\ b_{n+1}\ \ldots\ b_1\ b_0$; and mod M is an n-bit binary odd number $m_{n-1}\ m_{n-2}\ \ldots\ m_1\ m_0$, where $m_0=1$, the systolic linear-array modular multiplier comprising:

a linear array of n/2+2 processing elements with an identical architecture and an external AND gate so as to perform an n-bit multiplication, each of said processing elements including:
a plurality of full adders;
a plurality of AND gates; and
a plurality of D-type flip-flops;

wherein all of the above are interconnected in said processing elements to permit said systolic linear-array modular multiplier to implement modular multiplication $S=AB2^{-(n+6)}$ mod M by the steps of:

(1) performing the following pre-computation step:

$\overline{M}=((8-m_2m_1m_0)^{-1}\ \text{mod}\ 8)M$ $T=(\overline{M}[-]\pm 1)\text{div}8$, assuming $T=t_{n-1}\ \ldots\ t_1\ t_0$;

(2) defining $S_0=0$;

$q_{-2}=q_{-1}=0$ (3) performing the following iteration loop:
for i=0 to n+6 do $q_i=S_i\ \text{mod}\ 2$ $S_{i-1}=S_i\ \text{div}\ 2+q_{i-2}\ T+b_iA$ end;
and (4) performing the following computation:

$S_{n+8}=S_{n+7}+2q_{n+[s]\underline{s}}T$ $S=S_{n+8}+4q_{n+6}T$, wherein after operations of the steps, $S=AB2^{-(n+6)}$ mod M is obtained with input parameters of A, B, and M.

2. The modular multiplier of claim 1, each of said processing elements of the linear array is capable of computing $a^jb_{i-1}+a_{j-1}b_i+t_jq_{i-3}+t_{j-1}q_{i-2}+S_{in}$, and each of said processing elements further comprising at least four fuller adders including a first full adder, a second full adder, a third full adder, and a fourth full adder;

at least four AND gates including a first AND gate, a second AND gate, a third AND gate, and a fourth AND gate; and at least ten D-type flip-flops including a first D-type flip-flop, a second D-type flip-flop, a third D-type flip-flop, a fourth D-type flip-flop, a fifth D-type flip-flop, a sixth D-type flip-flop, a seventh D-ype flip-flop, an eighth D-type flip-flop, a ninth D-type flip-flop, and a tenth D-type flip-flop;

wherein said first full adder has three input ends respectively connected to receive the output of said second D-type flip-flop, the output of said first AND gate, and the output of said second AND gate; a carry output end connected to the input end of said second D-type flip-flop; and a sum output end connected the input end of said third D-type flip-flop;

said second full adder has three input ends respectively connected to receive the output of said fifth D-type flip-flop, the output of said third AND gate, and the output of said fourth AND gate; a carry output end connected to the input end of said fifth D-type flip-flop; and a sum output end connected the input end of said sixth D-type flip-flop;

said third full adder has three input ends respectively connected to receive the output of said seventh D-type flip-flop, the output of said third D-type flip-flop, and the output of said sixth D-type flip-flop; a carry output end connected to the input end of said seventh D-type flip-flop; and a sum output end connected to the input end of said eighth D-type flip-flop; and said fourth full adder has three input ends respectively connected to receive the output of said ninth D-type flip-flop, the output of said eighth D-type flip-flop, and $S_{in}$; a carry output end connected to the input end of said ninth D-type flip-flop; and a sum output end connected to the input end of said tenth D-type flip-flop; and wherein said first AND gate has two input ends connected respectively to receive $a_{j-1}$ and $b_i$, and one output end connected to one input end of said first full adder;

said second AND gate has two input ends connected respectively to receive $a_j$ and $b_{i-1}$, and one output end connected to another input end of said first full adder;

said third AND gate has two input ends connected respectively to receive $q_{i-2}$ and $t_{j-1}$, and one output end connected to one input end of said second full adder; and said fourth AND gate has two input ends respectively connected to receive $q_{i-3}$ and $t_j$, and one output end connected to another input end of said second full adder, and wherein
- said first D-type flip-flop has an input end connected to receive $b_i$, and an output end for outputting $b_{i-1}$;
- said second D-type flip-flop has an input end connected to receive the output from the carry output end of said first full adder and an output end connected to one input end of said first full adder;
- said third D-type flip-flop has an input end connected to the sum output end of said first full adder and an output end connected to one input end of said third full adder;
- said fourth D-ype flip-flop has an input end connected to receive $q_{j-2}$ and an output end for outputting $q_{i-3}$;
- said fifth D-type flip-flop has an input end connected to the carry output end of said second full adder and an output end connected to one input end of said second full adder;
- said sixth D-type flip-flop has an input end connected to the sum output end of said second full adder and an output end connected to one input end of said third full adder;
- said seventh D-type flip-flop has an input end connected to the carry output end of said third full adder and an output end connected to one input end of said third full adder;
- said eighth D-type flip-flop has an input end connected to the sum output end of said third full adder and an output end connected to one input end of said fourth full adder;
- said ninth D-type flip-flop has an input end connected to the carry output end of said fourth full adder and an output end connected to one input end of said fourth full adder; and
- said tenth D-type flip-lop has an input end connected to the sum output end of said fourth full adder and an output end for outputting $S_0$, wherein the processing elements are coupled together in cascade, the (n+3)-bit binary number of $a_j$ and the n-bit binary number of $t_j$ are sequentially inputted with two inputted numbers for each processing element if there are more than one left, to the processing elements from a last one of the processing elements the $S_{in}$ for a first one of the processing elements receives a zero quantity, and the last one of the processing elements sequentially exports a final result $S_{Out}$ and receives binary bits of $q_i$ and $b_i$ of B, in which the $S_{Out}$ is further inputted to the external AND gate to operate with a $q_{stop}$ by an AND logic operations so as to produce the $q_i$ for feedback to the last one of the processing elements, wherein the $q_{stop}$ is used to stop producing the $q_i$ after a clock cycle of n+9.

3. A systolic linear-array modular multiplier for implementing modular multiplication $S=AB2^{-(n+6)}$ mod M in a public-key cryptosystem, where n is an integer, representing an ability to operate an n-bit multiplication in the modular multiplication;

A is an (n+3)-bit binary number $a_{n+2}\ a_{n+1} \ldots a_1\ a_0$;

B is an (N+3)-bit binary number $b_{n+2}\ b_{n+1} \ldots b_1\ b_0$; and mod M is an n-bit binary odd number $m_{n-1}\ m_{n-2} \ldots m_1\ m_0$; where $m_0=1$, the systolic linear-array modular multiplier comprising:

linear array-array processing elements with identical architecture and an external logic date circuit so as to perform an n-bit multiplication, wherein the processing elements are arranged to form a computational architecture, which functionally comprises:

(1) pre-computational means for performing the following pre-computation step:

$$\overline{M}=((8-m_2 m_1 m_0)-1 \bmod 8)M$$

$$T=(\overline{M}+1)\text{div}8, \text{ assuming } T=t_{n-1} \ldots t_1\ t_0;$$

(2) means for defining $$S_0=0;$$

$$q_{-2}=q_{-1}=0;$$

(3) means for performing the following iteration loop:

for i=0 to n+6 do $$q_i=S_i \bmod 2$$

$$S_{i-1}=S_i \text{ div } 2+q_{i-2}\ T+b_i A$$

end;
and (4) computational means for solving the equation $$S_{n+8}=S_{n+7}+2q_{n+5}T$$

$$S=S_{n+8}+4q_{n+6}T,$$

to obtain the value of $S=AB2^{-(n+6)}$ mod M for increasing the encryption and decryption speed of the public-keys in the cryptosystem.

4. A systolic linear-array modular multiplier for implementing modular multiplication $S=AB2^{-(n+6)}$ mod M, where n is an integer, representing an ability to operate the n-bit multiplication in the modular multiplication;

A is an (n+3)-bit binary number $a_{n+2}\ a_{n+1} \ldots a_1\ a_0$;

B is an (n+3)-bit binary number $b_{n+2}\ b_{n+1} \ldots b_1\ b_0$; and mod M is an n-bit binary odd number $m_{n-1}\ m_{n-2} \ldots m_1\ m_0$, where $m_0=1$, the systolic linear-array modular multiplier comprising:

a linear array of n/2+2 processing elements with an identical architecture and an external AND gate so as to perform an n-bit multiplication, each of said processing elements including:
- a plurality of full adders;
- a plurality of AND gates; and
- a plurality of D-type flip-flops;

wherein all of the above are interconnected in said processing elements to permit parallel processing of the modular multiplication $S=AB2^{-(n+6)}$ mod M.

* * * * *